UNITED STATES PATENT OFFICE.

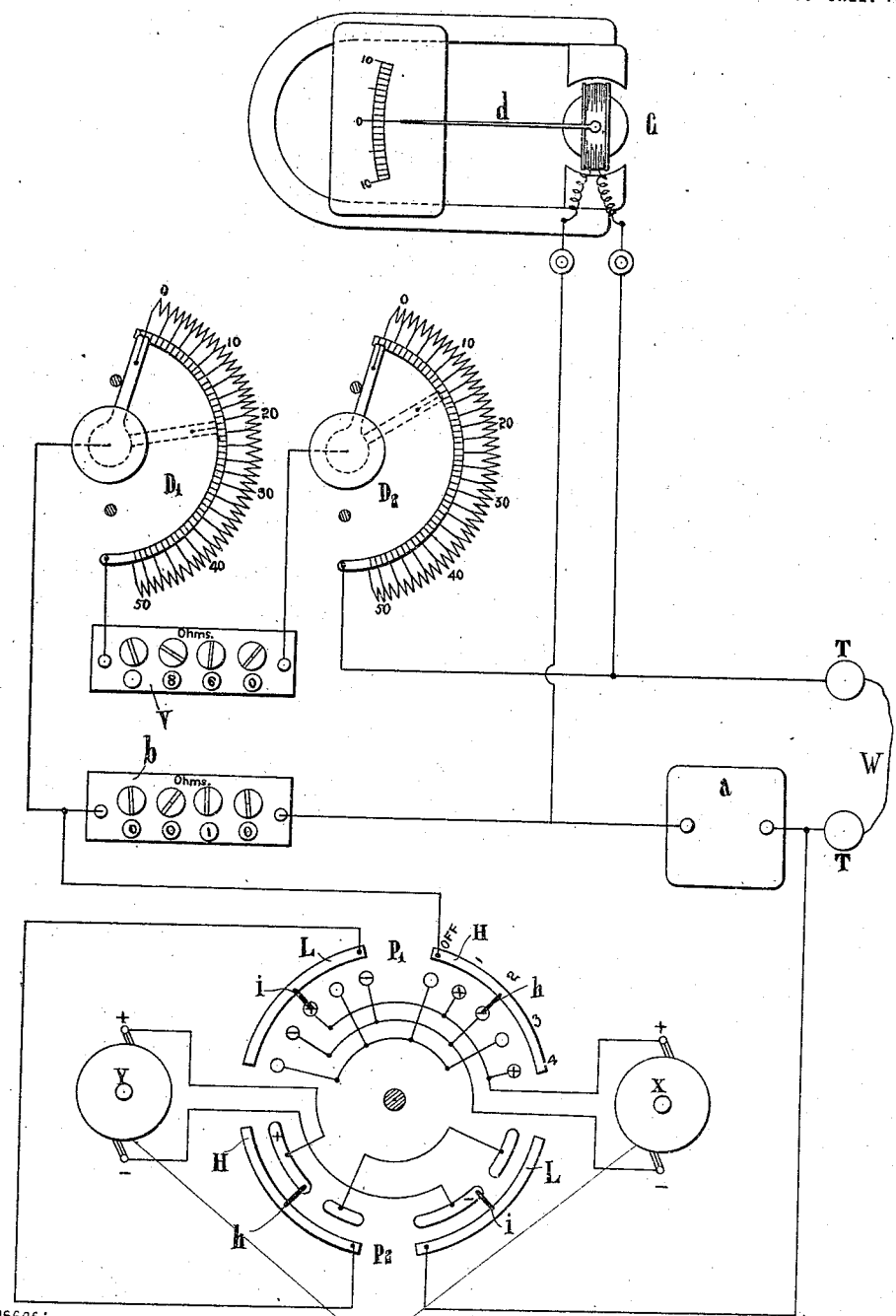

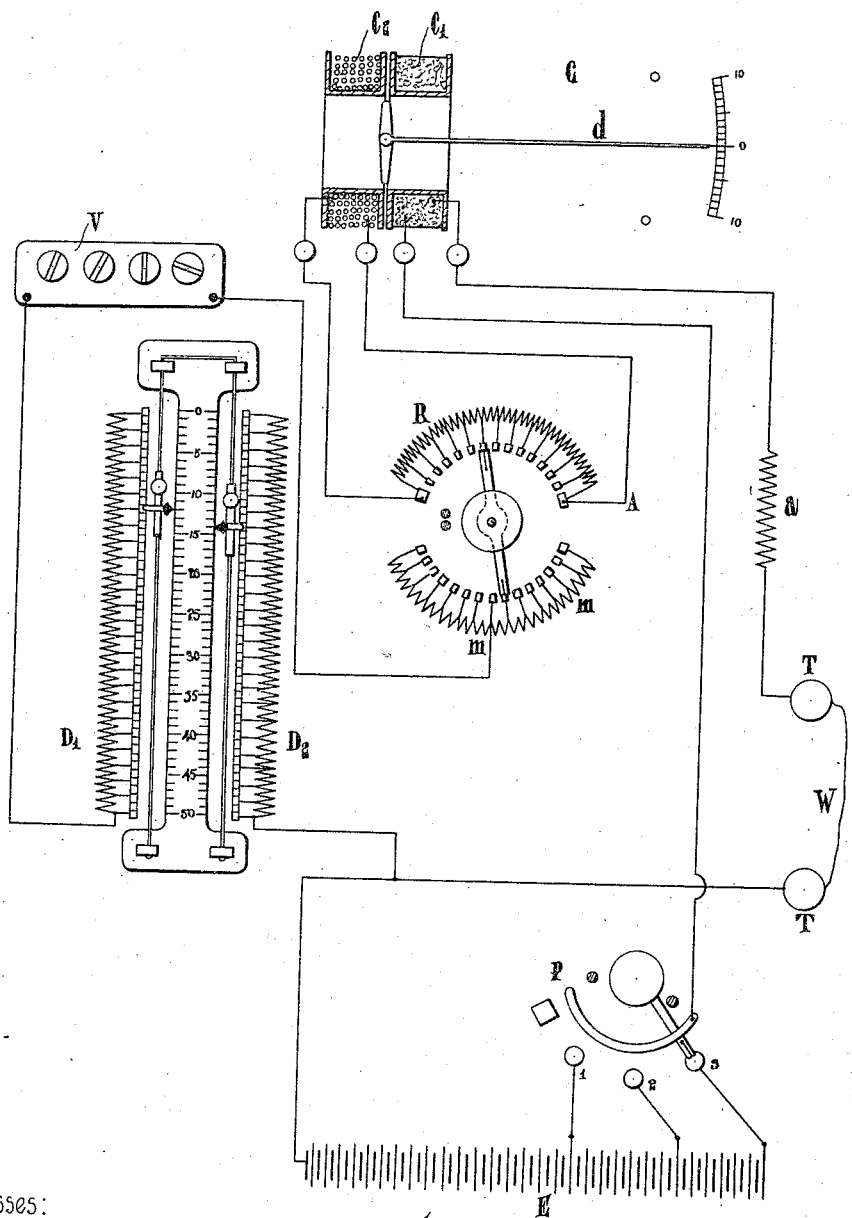

SYDNEY EVERSHED, OF CHISWICK, LONDON, ENGLAND.

RELATING TO THE TESTING OF INSULATION.

1,296,175.      Specification of Letters Patent.      Patented Mar. 4, 1919.

Original application filed March 21, 1914, Serial No. 826,372. Divided and this application filed December 30, 1915. Serial No. 69,466.

*To all whom it may concern:*

Be it known that I, SYDNEY EVERSHED, a subject of the King of Great Britain and Ireland, and residing at Acton Lane Works, Chiswick, London, W., England, have invented certain new and useful Improvements Relating to the Testing of Insulation, of which the following is a specification.

This invention relates to the testing of the insulation of electric systems and appliances and its object is to provide improved means for ascertaining the condition of the insulation.

In my U. S. application No. 826372 I have explained it has been known for many years that the resistance of insulation under ordinary working conditions is usually a good deal less at a high voltage than it is at a low voltage, and that I have discovered by experimental research one of the causes of this. I have then explained in considerable detail how the invention in that application consists in a method of diagnosis for ascertaining the condition of insulation by actual or implied reference to the whole or any significant part of the characteristic curve deduced from tests of the resistance or conductance of the insulation at two or more suitably chosen and different voltages.

As the principle underlying that invention also underlies the present invention reference should be made to the above numbered application for details thereof.

In another application filed of even date with the present application, I have described apparatus for measuring and testing insulation resistance (or conductance) specifically adapted for the determination and investigation of the whole or any significant part—for example two properly chosen points—of the characteristic curve which expresses the relation between the voltage applied to any electric system or appliance and the resistance (or conductance) of the insulating materials of the system or appliance. Such apparatus has been dealt with broadly in the application filed herewith.

Now when the object of the tests is to investigate some particular portion of the characteristic curve by the comparison of differences, as for example, when it is intended to ascertain the position of the point or region of inflexion, then in carrying out the invention the testing apparatus is arranged and adapted to facilitate the comparison of one difference with another, preferably by means of adjustable rheostats (herein referred to as "decrement rheostats") adapted to give direct indications of the differences in the resistance (or conductance) of the insulation, corresponding to successive increments of testing pressure.

Such apparatus has also been dealt with generally in the application filed herewith, but the present case deals with it specifically.

The present invention therefore in brief consists in apparatus adapted for the investigation of any part of the characteristic curve of insulation, comprising in combination an instrument for measuring resistance (or conductance) adapted by means of two or more decrement rheostats, or equivalent means, to indicate resistance differences (or conductance differences), and a source of electro-motive force suited to give the required series of testing pressures.

As has been explained when the object of the tests is to investigate some assigned portion of the characteristic curve a comparison of differences may be made. For example, to ascertain whether at any assigned voltage E, the characteristic curve has reached or passed beyond the point or region of inflexion, it is sufficient to test the insulation at three pressures namely E—$e$, E, and E+$e$ volts, and to ascertain the corresponding resistance values, say $a$, $b$, and $c$, respectively. Then if it is found that $b-c$ does not exceed $a-b$ the curve has not been carried beyond the point of inflexion by subjecting the insulation to the pressure E. Those who are acquainted with the mathematical theory of curves will understand that this process of comparison is based upon the fact that at a point of inflexion $dr/dE$ has its minimum value and $d^2r/dE^2$ changes its sign on passing through zero. In most characteristic curves of insulation the point of inflexion is somewhat ill defined, being a region of inflexion rather than a point, and it is therefore generally impracticable to make the necessary test with small increments of pressure. In practice it will often be necessary to make the difference $e$ volts as much as one fifth or even one fourth the value of the assigned pressure E, in order to insure a measurable difference in the corresponding resistance values. Hence the differential sensibility of the measuring instrument should be as great as possible, and for carrying out the process of comparison of differences a Wheatstone bridge or a differential galvanometer is more suitable than a galvanometer or an ohmmeter of ordinary type.

In carrying out this part of the invention the preferable type of measuring instrument is a Wheatstone bridge. In one form the bridge has ratio arms capable of adjustment to any value over a wide range in order that insulation resistances of widely different magnitudes may be balanced. The resistance in the third arm, corresponding with the adjustable arm of an ordinary bridge, is divided into two sections, each of which is separately adjustable and so arranged as regards the marking and figuring of the resistance values that the scale reading or figures indicate the decrement or amount of resistance withdrawn or subtratced from the total amount initially contained in the third arm—the inverse of the ordinary arrangement of a rheostat, which would be figured to indicate the amount of resistance added.

In carrying out the invention subject to the remarks made above, the measuring instrument or appliance may be of any known type.

In carrying out the invention the measuring instrument or appliance may be of any known type suitable for the measurement of insulation resistance or insulation conductance, but although the properties of insulators may be expressed in terms of either resistance or conductance, it has so long been the custom to regard resistance as the criterion of insulation that in describing the invention in detail it will be assumed that the testing apparatus is required to determine characteristic curves in terms of voltage and resistance.

As a matter of convenience in testing the indicating instrument may be so arranged that insulation resistance or conductance may be measured in the customary units whenever so desired without in any way limiting the power to indicate resistance differences at will for the purpose of obtaining results which are readily comparable.

The necessary testing pressures may be provided by a battery or alternatively by a dynamo or a magneto generator of direct current type, either hand driven or power driven as may be convenient, and adapted by means of multiple voltage devices to give the required series of testing pressures. A series of from ten to twelve pressures, suitably graded, will generally enable the complete characteristic curve to be investigated or drawn up to the breakdown point if the maximum pressure of the series is sufficient for the purpose. A series of six to eight pressures will generally suffice to draw the first part of the characeristic curve from about 50 volts up to the point of inflexion and if the sole object is to determine the position of the point of inflexion with respect to some assigned pressure—the working voltage of the system for example—then a series of three pressures will be enough. Any known principle either alone or in combination may be uesd for obtaining the multiple voltages required by my method of testing, as for example by a sub-divided battery, or by varying the speed of a dynamo, or by varying the induction or the number of effective turns of wire in the armature of a dynamo, or by a number of windings on a single armature each connected to one of a corresponding number of commutators, or by a multiple armature each element having its appropriate winding.

In order that my invention may be better understood it will now be described with reference to the accompanying drawings in which:

Figure 1 shows an arrangement according to one form of the present invention employing a Wheatstone bridge, and Fig. 2 a modification utilizing a differential galvanometer.

In Fig. 1, $a$ and $b$ are the ratio arms of a Wheatstone bridge of which the rheostat V and decrement rheostats $D_1$ and $D_2$ form the adjustable arm. A "decrement rheostat" is a rheostat in which the scale is figured so that the zero corresponds to the maximum resistance when the conductor circuit is closed, and lesser values of the resistance are indicated by figures which respectively give the difference or decrement of the corresponding resistance from the said maximum resistance. The indicating instrument G may be a sensitive galvanometer of any known type which is suitable for use with a bridge. The testing pressures may be supplied from any convenient source; by way of example a two-component generator having two armatures X and Y is shown, and their component pressures are algebraically added by a permutation switch having two members $P_1$ and $P_2$. In the present invention the armature Y may be wound to generate a pressure equal to the working voltage, say E volts, and the armature X may be wound to generate a fraction of that pressure, say $e$ volts. For example if E, the working voltage, be 500 volts then $e$ might very conveniently be made equal to 100 volts.

In Fig. 1 the permutation switch is shown set to the second voltage point which gives $E-e$ volts as the testing pressure. At this pressure the bridge has been balanced by first adjusting the ratio arm $b$ so that it bears a sufficiently small ratio to $a$, and then obtaining an accurate balance by adjusting the rheostat V—the decrement switches having been initially set so that each stands at zero scale reading, corresponding with maximum resistance. The permutation switch would next be moved to the third point giving a testing pressure of E volts. If the insulation resistance W, which is under test, is that of an absorbent insulator containing moisture then the raising of the voltage from $E-e$ to E volts will bring about a decrease in resistance and the bridge will be thrown out of balance. To restore the balance the control arm of the decrement rheostat $D_1$ must be moved in the direction of the arrow until the galvanometer G once more indicates a balance. The testing pressure would now be raised another step to $E+e$ volts by moving the permutation switch to the fourth point, thus bringing about a further decrease in the resistance of W and again upsetting the balance of the bridge. The contact arm of the decrement rheostat $D_2$ would now be moved in the direction of the arrow until the balance was again restored. Inspection of the readings of the decrement rheostats will now indicate at once which decrement is the greater. If the first decrement is greater than the second then obviously the resistance curve is convex to the base line at the pressure E volts. On the other hand if the first decrement is smaller than the second then the curve is concave to the base line, and if the two decrements happen to be equal then the curve must either be sensibly a straight line between the pressures $E-e$ and $E+e$, or there must be a point of inflexion on the curve at some point between those two pressures. In Fig. 1 the final position of the contact arms (as shown by the dotted lines) indicates a first decrement of about 22 and a second decrement of about 14, from which it would be inferred that at the working pressure E volts the curve of insulation resistance was convex to the base line and was still some considerable distance on the safe side of the point or region of inflexion.

This differential process may be extended so as to ascertain any desired number of decrements of resistance by making a number of increments of testing pressure, the resistance in the third arm of the bridge being subdivided into the required number of separate sections and each section figured to indicate decrement of resistance.

Fig. 2 illustrates a modification in which a differential galvanometer is substituted for the Wheatstone bridge which has just been described. The indicating instrument G is a galvanometer having two differentially wound coils $C_1$ and $C_2$ which carry the leakage current and the balancing current respectively. In order to obtain the maximum sensibility the leakage coil $C_1$ may be wound with the greatest possible number of turns of fine wire, and since for convenience the resistance of the balancing circuit should be very small compared with the values of insulation resistance W which are likely to be measured, the balancing coil $C_2$ should be wound with a relatively small number of turns of wire. If a further reduction in the relative effect of the balancing coil is required it may be obtained by means of a shunt A connected across its terminals. By way of example an adjustable universal shunt is shown. The switch arm of the shunt A is prolonged and controls the main resistances R of the shunt as well as the series of "make-up" resistances $m$ $m$, which are arranged to maintain the resistance of the shunted galvanometer at an approximately constant value. The make-up resistance is zero when the switch arm is in the middle position.

The circuit for the coil $C_2$ is as follows:— One terminal is connected to the positive pole of the battery and to one terminal of the shunt A. The circuit from the coil $C_2$ to the negative pole of the battery is through part of the resistances R of the shunt A, across the shunt arm to the make-up resistances $m$, thence through the rheostats V, $D_1$ and $D_2$, to the negative pole of the battery E.

The balancing circuit is completed through an adjustable rheostat V and two decrement rheostats $D_1$ and $D_2$. The way of obtaining the resistance decrements corresponding with voltage increments is of course analogous to that which has just been described in connection with Fig. 1. The decrement rheostats having been set to zero scale reading, the lowest of the three testing pressures is applied by means of the multiple voltage switch P, and a balance is effected by adjusting the rheostat V a preliminary coarse adjustment being made if required by means of the adjustable shunt A. The testing pressure is then increased one step at a time and the consequent reductions in the insulation resistance are balanced one after another by means of the decrement rheostats.

In Fig. 2 the decrement rheostats are so modified that the two decrements are indicated on a scale which is common to both. By way of example the second decrement is shown larger than the first, this indicating that the insulation curve is concave to the base line, and that at the middle voltage the curve has been carried beyond the point of inflexion. In Fig. 2 a fixed-coil galvanometer is shown, but any sensitive type of differential indicating instrument may be used.

In place of the generators and permutation switches shown in Fig. 1, a battery E has been chosen as the source of E. M. F. and a switch P provided to enable such voltages to be selected as may be desired.

The invention is not confined to the particular arrangements described, but may be modified in various ways without departing from the underlying principle of my diagnosis. For example if it is desired to carry out my invention by means of voltage-conductance curves instead of voltage-resistance curves the appropriate instruments would be modified, where necessary, to indicate conductance units. A Wheatstone bridge or a differential galvanometer would need no modifications except in the rheostats in the adjustable third arm, which would be composed of a number of unit resistances adapted so that any desired number could be connected up in parallel to give any total value of conductance. These and other similar inversions either necessary or convenient for the purpose of converting resistance measuring apparatus into conductance measuring apparatus will be readily understood by those who are conversant with the art of electrical measurement.

It is to be understood that in making measurements to determine two or more points on a characteristic curve the tests must proceed by ascending voltages from the lowest required testing pressure upward step by step to the highest pressure of the required series, in order that hysteresis effects, which are a marked feature of conduction through absorbent insulators, may be avoided.

Having now described my invention, what I claim as new and desire to secure by Letters Patent is:—

1. Apparatus for the investigation of any part of the characteristic curve of insulation, comprising in combination a Wheatstone bridge with variable ratio arms and having its fourth arm adapted to receive the test element, a rheostat in the third adjustable arm of the bridge adjustable to balance the resistance of the test element under the lowest initial value of the series of testing pressures, a plurality of decrement rheostats forming part of the circuit of the adjustable arm of the bridge all initially set at the zero of their respective scales and each in turn being adjusted to balance in combination with the previously adjusted resistances the resistance of the test element at one value of the series of testing pressures, and a source of electromotive force adapted to give the required series of testing pressures.

2. Apparatus for the investigation of any part of the characteristic curve of insulation, comprising in combination a Wheatstone bridge with variable ratio arms and having its fourth arm adapted to receive the test element, a rheostat in the third adjustable arm of the bridge adjustable to balance the resistance of the test element under the lowest initial value of the series of testing pressures, a plurality of decrement rheostats forming part of the circuit of the adjustable arm of the bridge all initially set at the zeros of their respective scales and each in turn being adjusted to balance in combination with the previously adjusted resistances the resistance of the test element at one value of the series of testing pressures, a scale common to the said decrement rheostats, and a source of electromotive force adapted to give the required series of testing pressures.

3. Apparatus for the investigation of any part of the characteristic curve of insulation, comprising in combination a differential galvanometer having two differentially wound coils which carry the leakage current and the balancing current respectively, a rheostat in the balancing circuit adjustable to balance the resistance of the test element under the lowest initial value of the series of testing pressures, a plurality of decrement rheostats in the balancing circuit all initially set at the zeros of their respective scales and each in turn being adjusted to balance in combination with the previously adjusted resistances the resistance of the test element at one value of the series of testing pressures, and a source of electromotive force adapted to give the required series of testing pressures.

4. Apparatus for the investigation of any part of the characteristic curve of insulation, comprising in combination a differential galvanometer having two differentially wound coils which carry the leakage current from the test element and the balancing current respectively, an adjustable shunt in parallel with the balancing current coil of the galvanometer, a rheostat in the balancing circuit adjustable to balance the resistance of the test element under the lowest initial value of the series of testing pressures, a plurality of decrement rheostats in the balancing circuit all initially set at the zeros of their respective scales and each in turn being adjusted to balance in combination with the previously adjusted resistances the resistance of the test element at one value of the series of testing pressures, and a source of electromotive force adapted to give the required series of testing pressures.

5. Apparatus for the investigation of any part of the characteristic curve of insulation, comprising in combination a differential galvanometer having two differentially wound coils which carry the leakage current from the test element and the balancing current respectively, a rheostat in the balancing circuit adjustable to balance the resistance of the test element under the lowest initial value of the series of testing pressures, a plurality of decrement rheostats in the balancing circuit all initially set at the zeros of their respective scales and each in turn being adjusted to balance in combination with the previously adjusted resistances the resistance of the test element at one value of the series of testing pressures, a scale common to the said decrement rheostats, and a source of electromotive force adapted to give the required series of testing pressures.

6. Apparatus for the investigation of any part of the characteristic curve of insulation, comprising in combination a differential galvanometer having two differentially wound coils which carry the leakage current from the test element and the balancing current respectively, an adjustable shunt in parallel with the balancing current coil of the galvanometer, a rheostat in the balancing circuit adjustable to balance the resistance of the test element under the lowest initial value of the series of testing pressures, a plurality of decrement rheostats in the balancing circuit all initially set at the zeros of their respective scales and each in turn being adjusted to balance in combination with the previously adjusted resistances the resistance of the test element at one value of the series of testing pressures, a scale common to the said decrement rheostats, and a source of electromotive force adapted to give the required series of testing pressures.

In testimony whereof, I have affixed my signature.

SYDNEY EVERSHED.

Copies of this patent may be obtained for five cents each, by addressing the "Commissioner of Patents, Washington, D. C."